United States Patent [19]

Donner et al.

[11] Patent Number: 5,209,167
[45] Date of Patent: May 11, 1993

[54] TROLLEY WHEEL ASSEMBLY AND HOUSING HAVING INJECTION MOLDED PLASTIC PARTS

[75] Inventors: Klaus Donner, Dohlenweg; Eberhard Becker, Westerwaldweg; Roland Staggl, Brunnenweg, all of Fed. Rep. of Germany

[73] Assignee: Mannesmann Aktiengesellschaft, Düsseldorf, Fed. Rep. of Germany

[21] Appl. No.: 771,981

[22] Filed: Oct. 4, 1991

[30] Foreign Application Priority Data

Oct. 4, 1990 [DE] Fed. Rep. of Germany ........ 4031685

[51] Int. Cl.$^5$ .............................. B61F 3/16; B61F 5/28
[52] U.S. Cl. .................... 105/180; 105/218.1; 105/220
[58] Field of Search .............. 104/89, 94; 105/148, 105/155, 157.1, 163.1, 180, 218.1, 220, 199.5; 295/36.1, 37, 38, 42.1, 43

[56] References Cited

U.S. PATENT DOCUMENTS

| | | | |
|---|---|---|---|
| 3,049,083 | 8/1962 | Potte et al. | 104/94 X |
| 4,550,664 | 11/1985 | Bitsch et al. | 105/163.1 X |
| 4,576,096 | 3/1986 | Toder | 104/94 |
| 5,005,912 | 4/1991 | Pipes | 105/220 X |
| 5,085,150 | 2/1992 | Moore et al. | 104/89 X |

FOREIGN PATENT DOCUMENTS

| | | | |
|---|---|---|---|
| 3134750 | 11/1983 | Fed. Rep. of Germany | |
| 2323559 | 8/1977 | France | 104/94 |

Primary Examiner—Robert J. Oberleitner
Assistant Examiner—S. Joseph Morano
Attorney, Agent, or Firm—Nils H. Ljungman and Associates

[57] ABSTRACT

The present invention relates to a wheel casing with a housing formed of two shells with bearings for a wheel. According to the invention, the shells (6, 7) of the housing (5) are injection molded parts, and they are connected to each other in a force-locked and/or a form-locked manner.

17 Claims, 3 Drawing Sheets

TROLLEY WHEEL ASSEMBLY AND HOUSING HAVING INJECTION MOLDED PLASTIC PARTS

BACKGROUND OF THE INVENTION

1. Field of the Invention

This invention relates to a trolley wheel assembly having a housing, formed by two shells, wherein the housing has bearings for a wheel.

2. Background of the Invention

In a wheel assembly of this type disclosed in Federal Republic of Germany Patent No. 31 34 750, which corresponds to U.S. Pat. No. 4,550,664, the shells of the wheel housing are made of pressed steel sheet and are then welded together. One disadvantage of this arrangement is that the wheel housing must usually be replaced by a new housing when the wheel becomes worn. For many applications of such a wheel assembly, steel sheet may be unnecessarily expensive and also heavy. The steel sheet wheel housing is also generally subject to corrosion, so that the enamel coating must generally be constantly inspected and replaced.

OBJECT OF THE INVENTION

An object of the present invention, therefore, is to create a lightweight, low-maintenance wheel assembly which is also easy to manufacture.

SUMMARY OF THE INVENTION

This and other objects of the present invention are achieved in that, preferably, the housing shells are manufactured by injection molding and are able to be connected to one another in a form-locked and/or a force-locked manner. Accordingly, since the housing shells are not permanently connected to one another, such a construction method then has the additional advantage that when a component of the wheel assembly, such as a part of the wheel or one of the bearings, becomes worn, only that worn part should generally require replacement. Other parts, therefore, can be re-used.

The injection molded part of the wheel assembly may be made of plastic or light alloy, and may have different wall thicknesses corresponding to the loads in question. Preferably, bearing rings are present for the bearings, along with reinforcement webs in the housing shells An injection molded wheel assembly constructed as such tends to have a low dead weight and is sufficiently stable for many applications. On account of its corrosion resistance, it is also generally suitable for operation in moist or humid environments, and for applications in the food processing industry. It can also be manufactured approximately 50% more economically than the known wheel assemblies.

The shells of the housing are preferably centered in relation to one another by means of centering devices in the form of centering strips which project into centering grooves. Additionally, the shells are preferably held together by means of snap lugs, whereby the snap lugs of one shell are connected to the other shell by means of lug webs and are engaged in lug openings of the other shell behind the snap lugs of the other shell. These snap lugs are preferably located on the edge of holes and are held in place by inserted adapter sleeves. The lug openings are preferably utilized for the insertion of a tool therethrough in releasing the snap connection.

In an additional configuration of the invention, the housing can have, on the upper edge or on the end surfaces, insertion grooves either for sliding blocks, which could accommodate screws, or for nuts. In this manner, the wheel assembly can be fastened to any desired component, such as a trolley. Since, frequently, it may be necessary to equip a wheel assembly with its own drive mechanism, the wheel assembly can have a toothed ring as a torque support for a geared motor. The shell preferably has a predetermined breaking area for the drive shaft of the wheel. Thus, a circular blank can be broken out of the central bearing area of the wheel assembly and the geared motor can be connected to the turbine shaft by means of the drive shaft.

To reduce the weight of the wheel assembly even further, the wheel can also be manufactured from light alloy or plastic.

BRIEF DESCRIPTION OF THE DRAWINGS

A preferred embodiment of the present invention is illustrated in the accompanying drawings and is explained in greater detail below.

DESCRIPTION OF THE PREFERRED EMBODIMENTS

A wheel 1 equipped with wheel flanges is mounted with its hub 2, via bearings 4, in a housing 5. A wheel assembly is thereby formed, having a toothed ring 10 as a torque support for a geared motor (not shown), wherein the output shaft of the motor is engageable with an internal toothing 3 of the hub 2.

The housing 5 of the wheel assembly is preferably formed of shells 6 and 7, which are connected to one another at a junction 8, and which preferably have insertion grooves 9 for each pair of sliding nuts or sliding blocks (not shown), by means of which the wheel assembly can be fastenable, by means of screws, to the objects to be moved. Also, to allow the output shaft of the motor to pass through, a circular blank may be broken out of the end surface of shell 6 and/or shell 7. Particularly, either or both of shell 6 and shell 7 may have a predetermined breaking area 27 for that purpose. Junction 8 is preferably an area characterized by the mutual interfacing of inwardly facing surface areas of shells 6 and 7.

Figure 4:
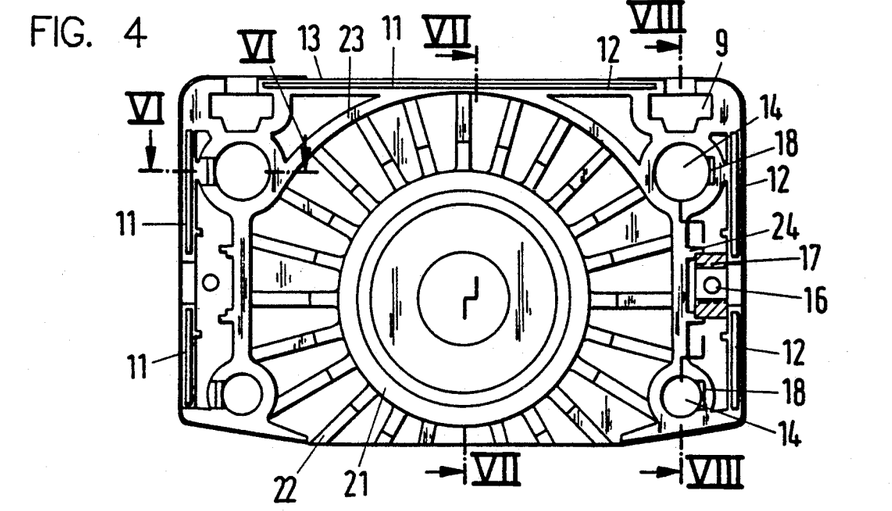
FIG. 4 shows an inside view of a housing shell.
Figure 7:
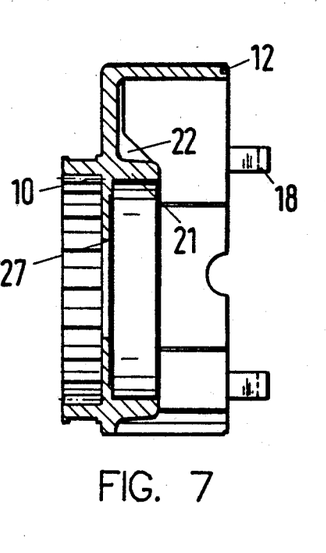
FIG. 7 shows a cross section through FIG. 4 along Line VII—VII.

FIGS. 4 and 7 show that a bearing ring 21 may be provided, for the bearings 4, and that several reinforcement webs 22 may extend from the bearing ring 21 to a peripheral web 23. The peripheral web 23 is preferably in contact with the upper surface of the wheel assembly, at a top center portion of the wheel assembly. That is, as shown in FIG. 4, peripheral web 23 preferably contacts the upper surface of the wheel assembly, generally at a tangent. Opposite the area of insertion grooves 9, the upper surface of the wheel assembly preferably has a recess 13, which can generally be easily manufactured in an injection molding process, and which allows for the installation of the wheel assembly under uneven surfaces. More particularly, as shown in FIG. 4, the recess 13 is preferably indented into the upper surface of the wheel assembly such that it is generally flanked by two slightly raised portions of the upper surface.

Weight reduction may be achieved by providing narrower wall thicknesses at one or more areas of the housing 5. The weight reduction resulting from the lower wall thicknesses at parts of the assembly which are generally less highly stressed is illustrated in FIG. 7, particularly inside the bearing 21, in front of the hub.

Figure 5:
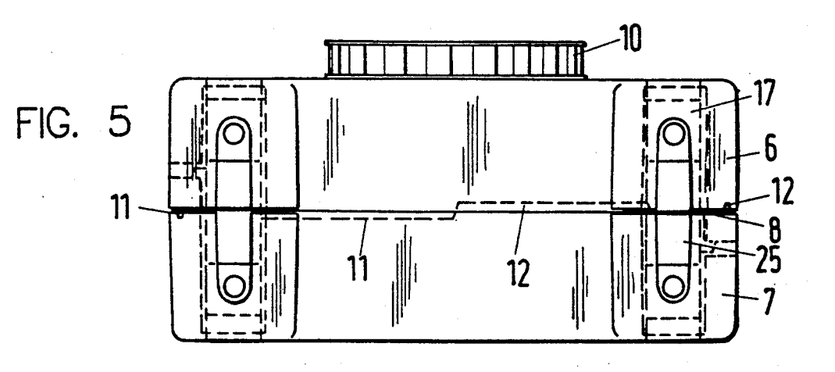
FIG. 5 shows a plan view of an assembled housing.

FIG. 5 shows the connection of the shells 6 and 7, which form the housing 5, by means of centering strips 11 and centering grooves 12, in the vicinity of the junction 8. The shell 6, as shown in the plan view in FIG. 5, preferably has centering strips 11 projecting from its left half, and recessed centering grooves 12 on its right half. As shown, shell 7 is constructed similarly in order to engage with shell 6. Thus, such a mating between shells 6 and 7 implies that the shells 6 and 7 can essentially be identical. Therefore, in a preferred embodiment of the present invention, only one casting mold is generally necessary for the production of the two shells 6 and 7. To assist in the centering of the wheel casing, the shells 6 and 7 preferably have holes 14 to hold adapter sleeves 15, by means of which plastic injection molded housing shells can also be precisely centered in relation to one another. Adapter sleeves 15 may be separate, tubular components which are inserted into holes 14 once shells 6 and 7 are positioned adjacent each other. Alternatively, the adapter sleeves 15 may be integral extensions of one or more of the shells 6 and 7. Of course, in the latter case, it would still be possible to form shells 6 and 7 from the same mold.

Figure 6:
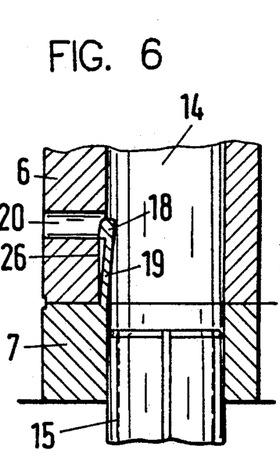
FIG. 6 shows a snap connection at the level of Section VI—VI through FIG. 4, on an enlarged scale.

The shells 6 and 7 are preferably connected to one another by means of snap lugs 18 shown in FIGS. 4, 6, 7 and 8. Snap lugs 18 are preferably located next to and along the holes 14, as shown in FIG. 6. Each snap lug 18 is connected by means of a lug web 19 to one of the shells of the housing, and projects into a lug opening 20 in the other shell. The snap lug 18, along with the lug web 19, is preferably held in place by the adapter sleeve 15 in the lug opening 20. Additionally a groove 26 is preferably provided to accommodate the lug web 19 when clamped, when the shells are clamped together in a form-locked, or interlocked, state.

FIG. 4 shows grooved or slotted lugs 24 to hold nuts 17, which nuts can be moved by tools which are introduced through positioning holes 16. Preferably, the nuts 17, like those which may be found in the upper insertion grooves 9, are accessible through housing slots 25, and allow for the wheel assembly to be fastened to a device, or, for example, to accommodate a bumper on the wheel assembly.

At this juncture, a more detailed discussion of several aspects of the structure of the present invention will provide additional insight into the features and capabilities of the present invention.

Figure 1:
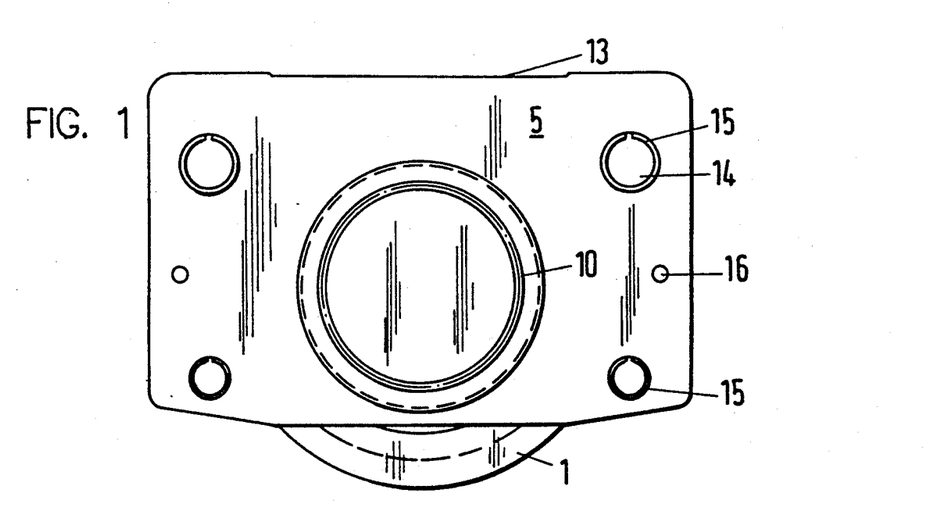
FIG. 1 shows a wheel assembly according to the present invention in a side view.

FIG. 1 shows an external side view of the assembled wheel assembly of the present invention. When viewed along an axis 1, it may be seen that the housing 5 has a generally rectangular cross-sectional shape about a central, vertical axis passing through the center of the wheel. As will be made clear throughout the descriptions below, the externally visible components of the wheel assembly exhibit symmetry about this axis.

Preferably, a lower side of the wheel assembly is parallel to an upper side of the assembly only throughout that portion of the lower side which forms a secant across the wheel 1. Otherwise, the lower side of the wheel assembly is defined by a shallow slope from the secant portion to the vertical sides of the assembly.

On an upper side of the assembly, recess 13, described above in reference to FIG. 4, is visible. Its horizontal extent is about the same as that of the secant portion of the lower side of the assembly. Also visible are the holes 14 for accommodating adapter sleeves 15. Preferably, the present invention utilizes four such holes 14. The two holes 14 disposed towards the upper side of the assembly preferably have a slightly larger diameter than the two holes 14 disposed towards a lower side of the assembly. Adapter sleeves 15, whether constituted by separate, insertable components or by integral extensions of either or both of shells 6 and 7, are preferably in the form of cylindrical shells having a generally small thickness. Additionally, as shown, each adapter sleeve 15 preferably has one axial groove disposed throughout the length of the sleeve 15, such that, when viewed from the side as in FIG. 1, each adapter sleeve generally has the cross-sectional configuration of a broken ring. The groove portion of each adapter sleeve 15 is preferably oriented towards the upper side of the wheel assembly, as shown.

In further reference to FIG. 1, positioning holes 16, described above, are visible. Preferably, each of two such positioning holes 16 is positioned about midway between two holes 14 on either side of the wheel 1. Also, the positioning holes 16 are preferably positioned at a slightly greater horizontal distance from the central vertical axis of the wheel assembly than the holes 14.

Figure 2:
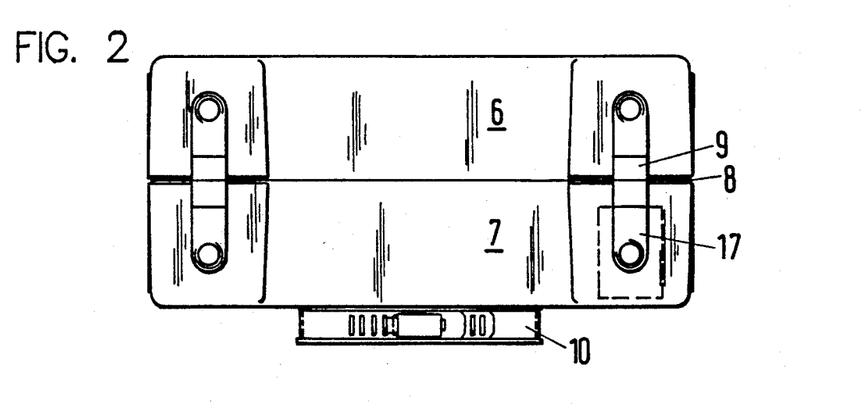
FIG. 2 shows a plan view of FIG. 1.

In FIG. 2, which is essentially a top view of FIG. 1, the outward protrusion of toothed ring 10 is visible. A ring clamp is preferably provided about the toothed ring 10 in a configuration to be described below. Also shown is the upper surface of the assembly wherein, as shown, on each of the shells 6 and 7, the recessed portion 13 is flanked on either side by slightly raised portions. Disposed within the slightly raised portions, and indented generally downward into the wheel assembly structure, are insertion grooves 9. Preferably, each raised portion has one of the insertion grooves 9 disposed therein. As shown, preferably, each insertion groove has a cross-sectional shape of two semicircles joined by two parallel lines. Thus, each shell 6 and 7 has one half of an insertion groove 9 at each raised portion. Shown by a dotted line is a nut 17, which preferably has a rectangular cross-sectional shape and is preferably located underneath each semicircular portion of each insertion groove 9.

Figure 3:
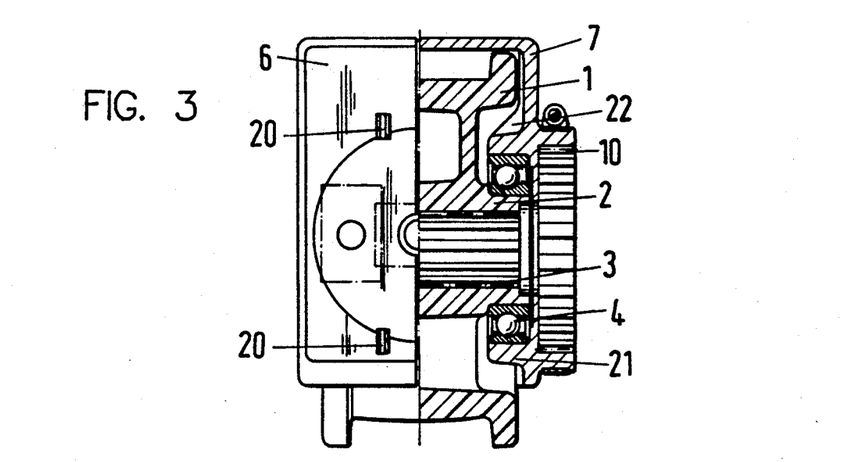
FIG. 3 shows an end view of FIG. 1, including a partial cross section therethrough.

FIG. 3 is a partially cut-away side view of the wheel assembly of the present invention. In the left-hand portion of FIG. 3, wherein the exterior of the wheel assembly is visible, two lug openings 20 are shown. Each shell 6 and 7 preferably has, on each of the two shorter sides thereof, two lug openings 20. Preferably, each lug opening 20 is in the form of a small slot having a vertically elongated rectangular shape. One lug opening 20 is preferably provided in the upper half of the wheel assembly, about halfway between a vertical midpoint of housing 5 and the upper side of the housing 5, and another lug opening 20 is preferably provided towards the bottom of the housing 5 a short distance therefrom.

Shown again by dotted lines are nuts 17, each of which preferably has a constituent hole in the housing 5 for the insertion of a bolt, screw or other means for attaching the wheel assembly to another object. Preferably, one such hole, a central hole, straddles the shells 6 and 7, and its constituent nut 17, preferably rectangular in shape, is disposed to be elongated in a horizontal direction. Another such hole preferably has generally the same vertical position as the central hole but is disposed almost at a midpoint of the horizontal extent of the shell 6 or 7 in question. For this other hole, the constituent nut 17 is preferably rectangular in shape and elongated in a vertical direction.

The right-hand portion of FIG. 3 affords detailed view of some of the internal components of the wheel assembly of the present invention. Wheel 1 is shown with its hub 2. Preferably, the wheel 1, about its perimeter, is characterized by a wide, generally flat groove flanked by circular disc portions. Thus, the rim or perimeter of the wheel 1 constitutes a shallow cross-sectional "U-shape" to ride on trolley rails or similar media for affording transportability of a wheel assembly such as that of the present invention. As shown in the upper half of the drawing, there may be spokes disposed between the hub 2 and the rim of the wheel 1. Additionally, hub 2 preferably has a generally cylindrical shape.

Bearing ring 21 is preferably an integral part of the structure of housing 5, as shown. Particularly, bearing ring 21 preferably juts inwardly into the housing 5. A reinforcement web 22 preferably runs from the furthest inward extent of bearing ring 21, along the outer annular surface thereof, and thence along the interior of the housing 5, that is, of the shell 6 or 7 in question, to the underside of the upper surface of the housing 5. In order to accommodate the full width of the rim of wheel 1, the web 22, as shown, is preferably substantially narrow in thickness, measured in a direction parallel to hub 2, along part of the interior of housing 5. Between an area where the surface of the rim of wheel 1 indents inward to the furthest inward extent of bearing ring 21, the reinforcement web 22 preferably increases in thickness until it meets the bearing ring 21, thus forming a generally triangular cross section in part of the web 22.

The spokes of wheel 1, discussed above, are thus preferably disposed further inwardly into the housing 5 than the flange portions of the rim of wheel 1, such that a space is afforded to accommodate the inward protrusion of bearing ring 21. Bearings 4 are preferably disposed between hub 2 and bearing ring 21. More particularly, a channel for accommodating the bearings 4 is preferably formed by two snap rings, one of which is disposed adjacent shaft 2 and the other of which is disposed adjacent bearing ring 21. Even more particularly, the shaft 2 is preferably provided with at least one annular indentation about its periphery, towards the outside of the housing 5, to accommodate a snap ring.

Preferably, protruding externally from the housing 5, from the shell 6 or 7 in question, is toothed ring 10 and a ringed housing therefor. The ring clamp, mentioned above, is preferably disposed about the periphery of the ringed housing for the toothed ring 10.

FIG. 4 shows an interior view of one of the housing shells 6 and 7. As shown, bearing ring 21 is centrally disposed. Extending outward therefrom are a number of reinforcement webs 22, preferably twenty-three in number, spaced at regular angular intervals about the bearing ring 21. In order to accommodate the extent of the rim of wheel 1, as measured in a direction parallel to hub 2, each is preferably shaped in a manner such as that described above in reference to FIG. 3.

The four holes 14, which are for accommodating adapter sleeves 15, as described above, are shown. The holes are preferably defined by cylindrical encasements which protrude in towards the interior of each of shells 6 and 7. Preferably, the peripheral web 23 extends, in an arc generally parallel to the bearing ring 21, between the cylindrical encasements of the two holes 14 located towards the upper side of the assembly. Furthermore, the reinforcement web 23 preferably intersects the two holes 14 at a tangent.

Preferably, nine of the reinforcement webs 22 extend from the bearing ring 21 to the peripheral web 23. On each side of the assembly, between holes 14 which are positioned along a vertical line with respect to each other, a straight, vertical web portion is preferably disposed. Thus, a number of reinforcement webs preferably terminate at either of the two vertical web portions. Preferably, six reinforcement webs 22 are disposed as such, three on each side. Additionally, each of two other reinforcement webs 22 terminate at the cylindrical encasements of each of the two lower holes 14.

The remaining six reinforcement webs 22 preferably terminate at the lower side of the assembly. The two reinforcement webs 22 closest to a vertical axis of symmetry of the bearing ring 21 extend only a short distance and thus do not have the same profile as the other reinforcement webs 22; particularly, they are not disposed opposite the rim of wheel 1 so do not taper to as small a thickness as do the other reinforcement webs 22.

Shown in FIG. 4 are centering strips 11 and centering grooves 12. Preferably, to the left of a central vertical axis of the assembly, centering strips 11 are disposed about the periphery of the shell 6 or 7 in question. The centering strips are preferably narrow and protrude a short distance above the surface of the shell 6 or 7. Accordingly, to the right of a central vertical axis of the assembly, centering grooves 12 are similarly disposed about the periphery of the shell 6 or 7. The centering grooves 12 of one shell may be configured to receive the centering strips 11 of the other shell 6 or 7 to provide a force-locking, or friction-locking, connection between shells 6 and 7.

Preferably, slotted grooves 24 are integral extensions of the vertical web members mentioned above. Particularly, on each side of the assembly, a slotted groove 24 is preferably formed by two small protrusions. Each protrusion has a step-like indentation so as to accommodate a nut 17 between the two protrusions.

FIG. 5 is another top view of the wheel assembly of the present invention. In this case, the toothed ring 10 is mounted on shell 6 instead of on shell 7, as was shown in FIG. 3. it should be understood that toothed ring 10 may be mounted on either or both of shells 6 and 7.

On the top of the assembly, as shown in FIG. 5, centering strip 11 and centering groove 12 are represented by a dotted line. As shown, on the top edge of the shells 6 and 7 of the assembly, the transition from a centering strip 11 to a centering groove 12 is continuous and involves a short diagonal indentation.

FIG. 6 shows components of the snap lugs in greater detail. Particularly, a snap lug 18, extending from a lug web 19, extends outward from the shell 7. Preferably, to achieve a form-locking, or interlocking, connection in the form of a snap locking connection, the corresponding holes 14 of each of shells 6 and 7 are aligned and then brought into contact. In the process, the snap lug 18 enters the hole 14 of shell 6 and rides along the surface of groove 26. When the surfaces of shells 6 and 7 touch, the snap lug reaches the lug opening 20 and thence snaps into the lug opening 20. At that point, the lug web 19 will be completely flush against the surface of groove 26. Thus, because of the dimensions of the lug web 19, and groove 26, an even cylindrical passage is afforded through mutually engaged cylindrical holes 14. Thence, an adapter sleeve 15 may be inserted into the holes 14 to hold in place the snap lock connection.

It will be appreciated that the adapter sleeves 15 could provide an additional means of secure connection in the form of a force-locking, or friction-locking, connection. Particularly, and most preferably, the dimensions of the adapter sleeves 15 and the holes 14 may be chosen to ensure a firm, friction-locked connection between shells 6 and 7. More particularly, each hole 14 should preferably have a slightly smaller diameter than its corresponding adapter sleeve 15. Thus, the structure of each adapter sleeve 15, as shown, should preferably ensure a slight degree of compressibility in order that a force may be applied to the sleeve 15 to compress the sleeve 15 and narrow the axial groove thereof, thus enabling the sleeve 15 to be inserted into the hole 14 and to thence expand slightly to ensure a tight-fitting connection between shells 6 and 7.

FIG. 7 shows the protrusion of snap lugs 18 from one of the shells 6 and 7. It can also be seen that breaking area 27 includes a disc of a substantially narrow thickness in order to facilitate its removal and/or breaking from the shell.

Figure 8:
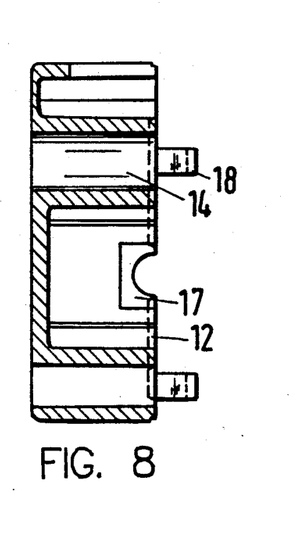
FIG. 8 shows a cross section through FIG. 4 along Line VIII—VIII.

FIG. 8 shows the holes 14 extending through the shell. In the upper portion of FIG. 8, the insertion groove 9 is more clearly shown. Particularly, it can be seen that insertion groove 9 is preferably in the form of a two-level stepped trough, wherein a wider trough is indented into the upper surface of the assembly and a narrower trough is further indented through the wider trough. Preferably, as shown, part of the upper surface of the assembly overhangs the groove 9 in order to accommodate and secure the position of a sliding block.

Figure 9:
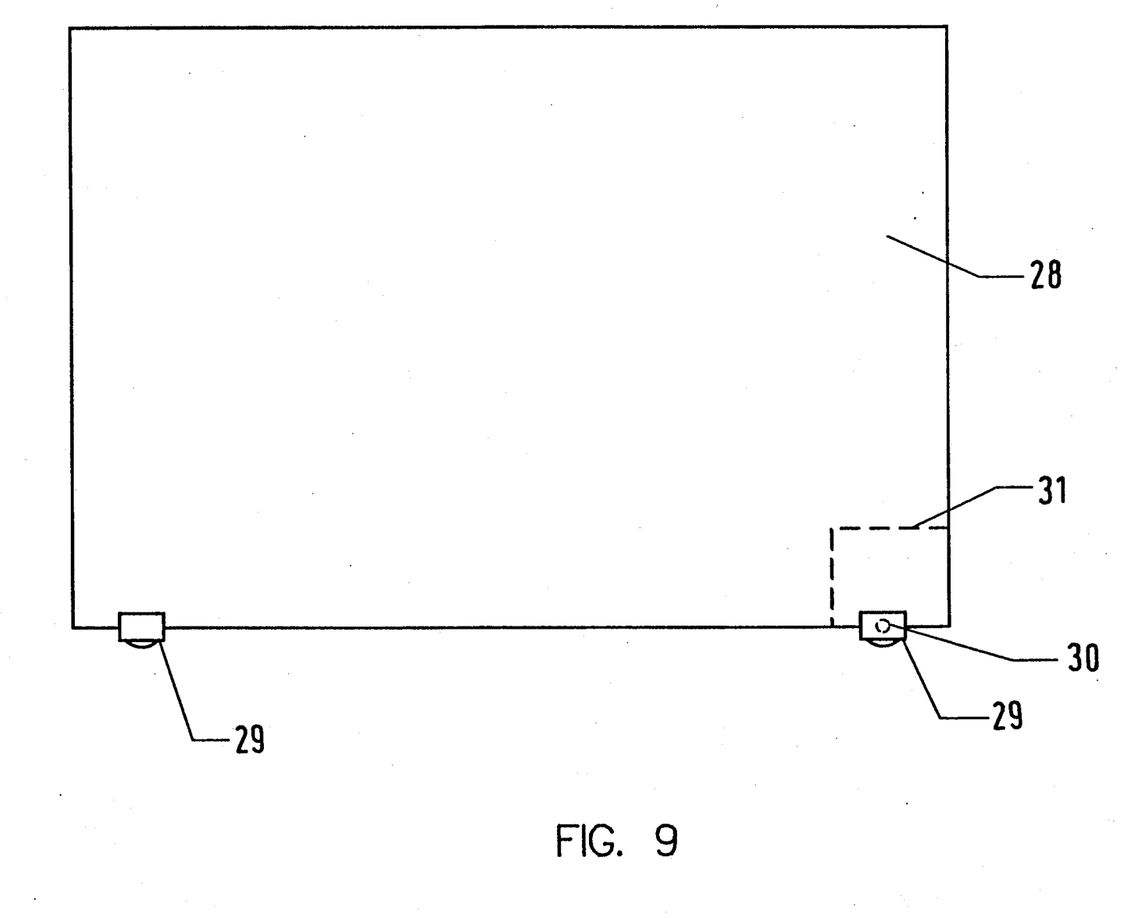
FIG. 9 shows, schematically, a trolley having several wheel assemblies of the present invention mounted thereupon.

FIG. 9 shows, schematically, a trolley 28 having several wheel assemblies 29 of the present invention, preferably four, mounted thereupon. Preferably, a drive shaft 30 is accommodated in two wheel assemblies 29 in the manner described further above.

One aspect of the invention resides broadly in a wheel casing with a housing formed of two shells, with bearings for a wheel, characterized by the fact that the shells 6, 7 of the housing 5 are manufactured by injection molding, and are connected to one another in an interlocked and/or a friction-locked manner.

Another aspect of the invention is a wheel casing plastic.

Yet another aspect of the invention is a wheel casing characterized by the fact that the injection molded part is alloy. A further aspect of the invention is a wheel casing characterized by the fact that the walls of the shells 6, 7 are not of uniform thickness.

A yet further aspect of the invention is a wheel casing characterized by the fact that the shells 6, 7, in addition to bearing rings 21, have reinforcement webs 22 for the bearings 4.

Yet another further aspect of the invention is a wheel casing characterized by the fact that the shells 6, 7 are held together at a junction 8 by means of centering devices facing one another.

An additional aspect of the invention is a wheel casing characterized by the fact that the shells 6, 7 have, as centering devices on their edges, centering strips 11, which project into centering grooves 12 in the facing shell.

A yet additional aspect of the invention is a wheel casing characterized by the fact that each of the shells 6, 7 seen from above, has a centering strip 11 one side and a centering groove 12 on the other side.

A further additional aspect of the invention is a wheel casing characterized by the fact that the shells 6, 7 are held together by means of snap lugs 18.

A yet further additional aspect of the invention is a wheel casing characterized by the fact that the snap lugs 18 are connected to the corresponding shells 6, 7 by means of lug webs 19, and are engaged in lug openings 20 in the other shell.

Another further additional aspect of the invention is a wheel casing characterized by the fact that the lug webs 19 with the snap lugs 20 are located on the edge of holes 14 and are held by adapter sleeves 15 in grooves 26 or in the lug openings 20.

A yet another additional aspect of the invention is a wheel casing characterized by the fact that the shells 6, 7 on the upper edge and/or the end surfaces have insertion grooves 9 for nuts 17 or sliding blocks for screws.

Another yet further aspect of the invention is a wheel casing characterized by the fact that one of the shells 6, 7 is provided with a toothed ring 19 which serves as a torque support for a geared motor.

A still further aspect of the invention is a wheel casing characterized by the fact that the shells 6, 7, inside the bearing rings 21, have a predetermined breaking point 27 for a drive shaft of the wheel 1.

A still further additional aspect of the invention is a wheel casing characterized by the fact that the wheel 1 is made of light alloy or plastic.

Examples of devices which may utilize the wheel assembly of the present invention, including trolleys, transporter devices and crane girders, may be found in the following U.S. Pat. Nos.: 4,550,664, entitled "Track Wheel Block," which issued Nov. 5, 1985; U.S. Pat. No. 4,886,285, "Transporter with Wheels," Dec. 12, 1989; "Traveling Crane with Top Girders at the End of a Bridge Girder," May 31, 1983; U.S. Pat. No. 4,576,100, "Crane for Nuclear Waste Handling Facilities," Mar. 18, 1986; U.S. Pat. No. 4,503,984, "Telfer Carriage," Mar. 12, 1985; U.S. Pat. No. 4,421,242, "Panel Locator," Dec. 20, 1983; U.S. Pat. No. 4,402,414, "Means for Distributing Load Uniformly to Wheels," Sept. 6, 1983; U.S. Pat. No. 4,382,413, "Earthquake Resistant Crane," May 10, 1983; U.S. Pat. No. 4,360,112, "Two-way Extendable Crane Trolley," Nov. 23, 1982; U.S. Pat. No. 4,318,346, "Biased Traveling Crane Drive," Mar. 9, 1982; U.S. Pat. No. 5,013,203 "Electrically Driven Self-Propelled Truck and Apparatus for Changing Course Thereof," May 7, 1991; U.S. Pat. No. 4,538,323, "Bearing Supported Truck Assembly for Sliding Door," Sept. 3, 1985; and U.S. Pat. No. 4,109,343, "Trolley Wheel Assembly," Aug. 29, 1978.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A wheel assembly for being mounted on a trolley, said wheel assembly comprising:
   a housing comprising a first shell and a second shell, said first shell and said second shell being connected to one another to form said housing;
   a wheel being mounted for rotational movement at least partly within said housing;
   bearing means for guiding the rotational movement of said wheel;
   at least one of:
   means for interlocking said first shell and said second shell together; and
   means for friction-locking said first shell and said shell together; and
   means for friction-locking said first shell and said second shell together;
   to connect said first shell and said second shell to form said housing;
   said wheel comprising a central hub being disposed across said housing;
   said bearing means comprising a plurality of bearings;
   means for retaining said bearings towards said hub;
   means for reinforcing said bearing means;
   each of said first wheel and said second shell having an interior surface facing towards said wheel;
   said reinforcing means being disposed on at least one of said first shell and said second shell; and
   said reinforcing means comprising a plurality of spoke-like webs extending away from said retaining means along the interior surface of said at least one of said first shell and said second shell.

2. The wheel assembly according to claim 1, wherein said first shell and said second shell are injection molded.

3. The wheel assembly according to claim 2, wherein each of said first shell and said second shell comprises at least one of an injection-molded plastic material and an injection-molded light alloy material.

4. The wheel assembly according to claim 3, further comprising:
   each of said first shell and second shell defining at least one wall portion; and
   said at least one wall portion of each of said first shell and said second shell having varying thicknesses.

5. The wheel assembly according to claim 4, wherein said retaining means comprises an annular protrusion protruding from the interior surface of said at least one of said first shell and said second shell towards said wheel.

6. The wheel assembly according to claim 5, wherein said bearings are supported between said retaining means and said hub.

7. The wheel assembly according to claim 6, further comprising:
   each of said first shell and said second shell having an interfacing surface;
   the interfacing surface of said first shell being mutually interfaced with the interfacing surface of said second shell; and
   means for centering said first shell and said second shell with respect to one another such that the interfacing surface of said first shell is mutually interfaced with the interfacing surface of said second shell.

8. The wheel assembly according to claim 7, further comprising:
   said centering means comprising:
   at least one centering protrusion disposed on at least one of said first shell and said second shell; and
   at least one centering groove disposed in the other of said at least one of said first shell and said second shell; and
   said at least one centering protrusion extending into said at least one centering groove to center said first shell and said second shell with respect to one another.

9. The wheel assembly according to claim 8, further comprising:
   a central vertical axis defining a first half and a second half of each of said first shell and said second shell, the first half of said first shell being engaged with the second half of said second shell and the second half of said first shell being engaged with the first half of said second shell;
   each of the first half of said first shell and the first half of said second shell having at least one said centering protrusion; and
   each of the second half of said first shell and the second half of said second shell having at least one said centering groove to enable the engagement of said first half of said first shell with said second half of said second shell and said second half of said first shell with said first half of said second shell.

10. The wheel assembly according to claim 9, wherein said interlocking means comprising snap lug means.

11. The wheel assembly according to claim 10, further comprising:
    said snap lug means comprising:
    at least one snap lug extending from at least one of said first shell and said second shell;
    at least one lug opening being disposed in the other of said at least one of said first shell and said second shell; and
    each said at least one snap lug being secured in a corresponding one of said at least one lug opening to provide an interlocking connection between said first shell and said second shell.

12. The wheel assembly according to claim 11, wherein said friction-locking means comprises at least one of:
    a) at least one sleeve have disposed through said first shell and said second shell;
    at least one sleeve, each said at least one sleeve being disposed through a corresponding one of said at least one sleeve hole; and
    each said at least one sleeve being firmly engaged with its corresponding one of said at least one sleeve hole to provide a friction-locking connection between said first shell and said second shell; and b) said centering means, wherein said said centering means is configured to provide a friction-locking connection between said first shell and said second shell.

13. The wheel assembly according to claim 12, wherein said wheel assembly has a plurality of external sides, said wheel assembly further comprising:
at least one groove for accommodating at least one of:
at least one sliding block; and
at least one nut;
said at least one groove being disposed in at least one of said external sides;
a toothed ring for providing torque support for a geared motor;
a breaking area disposed on at least one of said first shell and said second shell, said breaking area for being penetrated to create a hole to accommodate a drive shaft;
said wheel comprising at least one of a plastic material and a light alloy material;
said hub comprising an internal toothing to accommodate a toothed drive shaft;
at least one of said external sides of said wheel assembly comprising holes for mounting said wheel assembly on a trolley;
one of said external sides being an upper surface of said wheel assembly;
said at least one groove being disposed in said upper surface;
said at least one groove being two grooves;
said upper surface having a recess indented therein;
said recess being generally shallow;
said upper surface having two raised portions, each of said two raised portions flanking said recess such that said recess is disposed between said two raised portions;
each of said two grooves being disposed in one of said raised portions;
said at least one sleeve hole being four sleeve holes;
an upper two of said sleeve holes being disposed towards said upper surface of said wheel assembly;
said wheel assembly having a lower area opposite said upper surface;
a lower two of said sleeve holes being disposed towards said lower area of said wheel assembly;
a peripheral web connecting said upper two sleeve holes;
said peripheral web being an arc generally parallel to said retaining means;
some of said webs terminating at said peripheral web;
said peripheral web intersecting said upper surface generally at a tangent;
said first shell and said second shell having an identical injection-molded construction;
said at least one sleeve being four sleeves;
each of said at least one snap lug comprising a head portion and a web portion;
said head portion being disposed in one of said at least one lug opening;
each of said at least one snap lug being disposed in the vicinity of one of said sleeve holes;
each said lug opening intersecting said one of said sleeve holes generally perpendicularly;
at least one of said sleeve holes comprising a recess to accommodate said lug web, such that said lug web is flush with said one of said sleeve holes to create a substantially even cylindrical passage;
slotted lug means for accommodating at least one nut;
said at least one nut being disposed adjacent one of said holes;
said two upper sleeve holes having a slightly larger diameter than said two lower sleeve holes;
each of said sleeves having a generally cylindrical shape;
each of said sleeves having an axial groove running therethrough to break said generally cylindrical shape;
each of said grooves generally having a cross-sectional shape of two semicircles joined by two parallel lines;
each said lug opening for receiving a tool therethrough to release each said snap lug;
clamp means disposed about said toothed ring;
said clamp means comprising a ring clamp;
said hub having a generally cylindrical shape;
said wheel having a rim;
said rim having a groove portion and side flange portions defining a generally U-shaped cross section;
said wheel having a plurality of spokes;
snap rings supporting said bearings;
one of said snap rings being disposed between said retaining means and said bearings;
another of said snap rings being disposed between said hub and said bearings;
said plurality of webs being twenty-three webs;
said twenty-three webs being disposed at substantially regular angular intervals about said retaining means;
nine of said twenty-three webs intersecting said peripheral web portion;
two vertical web portions, each of said two vertical web portions being disposed between one of said two upper sleeve holes and one of said two lower sleeve holes;
three of said webs intersecting one of said two vertical web portions;
another three of said webs intersecting another of said two vertical web portions;
each of said two grooves comprising:
an upper trough indented in said upper surface;
a lower trough indented in said upper trough; and
said lower trough being generally narrower than said upper trough;
said upper surface overhanging a portion of each of said two grooves; and
each of said twenty-three webs initiating at a furthest inward extent of said annular protrusion of said retaining means.

14. A trolley comprising:
at least one wheel assembly being attached to said trolley;
said at least one wheel assembly comprising a housing and a wheel being mounted for rotational movement at least partly within said housing;
said housing comprising a first shell and a second shell, said first shell and said second shell being connected to one another to form said housing;
said first shell and said second shell being injection molded;
at least one of:
means for interlocking said first shell and said second shell together; and means for friction-locking said first shell and said second shell together;
to connect said first shell and said second shell to form said housing;
said wheel comprising a central hub being disposed across said housing;
bearing means for guiding the rotational movement of said wheel;
means for retaining said bearings toward said hub;
means for reinforcing said bearing means;
said bearing means comprising a plurality of bearings;
each of said first shell and said second shell comprising at least one of an injection-molded plastic material and an injection-molded light alloy material;
each of said first shell sand said second shell having an interior surface facing towards said wheel;
said reinforcing means being disposed on at least one of said first shell and said second shell; and
said reinforcing means comprising a plurality of spoke-like webs extending away from said retaining means along the interior surface of said at least one of is a first shell and said second shell.

15. The trolley according to claim 14, further comprising:
each of said first shell and second shell defining at least one wall portion;
said at least one wall portion of each of said first shell and said second shell having varying thicknesses;
said retaining means comprising an annular protrusion protruding from the interior surface of said at least one of said first shell and said second shell towards said wheel;
said bearings being supported between said retaining means and said hub;
each of said first shell and said second shell having an interfacing surface;
the interfacing surface of said first shell being mutually interfaced with the interfacing surface of said second shell;
mean for centering said first shell sand said second shell with respect to one another such that the interfacing surface of said first shell is mutually interfaced with the interfacing surface of said second shell;
said centering means comprising:
at least one centering protrusion disposed on at least one of said first shell and said second shell; and
at least one centering groove disposed in the other of said at least one of said first shell and said second shell;
said at least one centering protrusion extending into said at least one centering groove to center said first shell and said second shell with respect to one another;
a central vertical axis defining a first half and a second half of each of said first shell and said second shell, the first half of said first shell being engaged with the second half of said second shell and the second half of said first shell being engaged with the first half of said second shell;
each of the first half of said first shell and the first half of said second shell having at least one said centering protrusion;
each of the second half of said first shell and the second half of said second shell having at least on said centering groove to enable the engagement of said first half of said first shell with said second half of said second shell and said second half of said first shell with said first half of said second shell;
said interlocking means comprising snap lug means;
said snap lug means comprising:
at least one snap lug extending from at least one of said first shell and said second shell;
at least one lug opening being disposed in the other of said at least one of said first shell and said second shell;
each said at least one snap lug being secured in a corresponding one of said at least one lug opening to provide an interlocking connection between said first shell and said second shell;
said friction-locking means comprising at least one of:
a) at least one sleeve hole disposed through said first shell and said second shell;
at least one sleeve, each said at least one sleeve being disposed through a corresponding one of said at least one sleeve hole; and
each said at least one sleeve being firmly engaged with its corresponding one of said at least one sleeve hole to provide a friction-locking connection between said first shell and said second shell; and
b) said centering means, wherein said said centering means is configured to provide a friction-locking connection between said first shell and said second shell;
each of said at least one wheel assembly having a plurality of external sides;
at least one of said at least one wheel assembly comprising at least one groove for accommodating at least one of:
at least one sliding block; and
at least one nut;
said at least one groove being disposed in at least one of said external sides;
a geared motor for driving said wheel;
at least one of said at least one wheel assembly comprising a toothed ring for providing torque support for said geared motor;
said geared motor comprising a drive shaft engaged with said hub;
said wheel comprising at least one of a plastic material and a light alloy material;
said hub comprising an internal toothing to engage said drive shaft;
at least one of said external sides of said wheel assembly comprising holes;
at least one of said at least one wheel assembly being mounted on said trolley by means of said holes;
one of said external sides being an upper surface;
said at least one groove being disposed in said upper surface;
said at least one groove being two grooves;
said upper surface having a recess indented therein;
said recess being generally shallow;
said upper surface having two raised portions, each of said two raised portions flanking said recess such that said recess is disposed between said two raised portions;
each of said two grooves being disposed in one of said raised portions;
said at least one sleeve hole being four sleeve holes;
an upper two of said sleeve holes being disposed towards said upper surface of said wheel assembly;
said wheel assembly having a lower area opposite said upper surface;

a lower two of said sleeve holes being disposed towards said lower area of said wheel assembly;

a peripheral web connecting said upper two sleeve holes;

said peripheral web being an arc generally parallel to said retaining means;

some of said webs terminating at said peripheral web;

said peripheral web intersecting said upper surface generally at a tangent;

said first shell and said second shell having an identical injection-molded construction;

said at least one sleeve being four sleeves;

each of said at least one snap lug comprising a head portion and a web portion;

said head portion being disposed in one of said at least one opening;

each of said at least one snap lug being disposed in the vicinity of one of said sleeve holes;

each said lug opening intersecting said one of said sleeve holes generally perpendicularly;

at least one of said sleeve holes comprising a recess to accommodate said lug web, such that said lug web is flush with said one of said sleeve holes to create a substantially even cylindrical passage;

each of said at least one wheel assembly comprising slotted lug means for accommodating at least one nut;

said at least one nut being disposed adjacent one of said holes;

said two upper sleeve holes having a slightly larger diameter than said two lower sleeve holes;

each of said sleeves having a generally cylindrical shape;

each of said sleeves having an axial groove running therethrough to break said generally cylindrical shape;

each of said grooves generally having a cross-sectional shape of two semicircles joined by two parallel lines;

each said lug opening for receiving a tool therethrough to release each said snap lug;

clamp means disposed about said toothed ring;

said clamp means comprising a ring clamp;

said hub having a generally cylindrical shape;

said wheel having a rim;

said rim having a groove portion and side flange portions defining a generally U-shaped cross section;

said wheel having a plurality of spokes;

snap rings supporting said bearings;

one of said snap rings being disposed between said retaining means and said bearings;

another of said snap rings being disposed between said hub and said bearings;

said plurality of webs being twenty-three webs;

said twenty-three webs being disposed at substantially regular angular intervals about said retaining means;

nine of said twenty-three webs intersecting said peripheral web portion;

two vertical web portions, each of said two vertical web portions being disposed between one of said two upper sleeve holes and one of said two lower sleeve holes;

three of said webs intersecting one of said two vertical web portions;

another three of said webs intersecting another of said two vertical web portions;

each of said two grooves comprising:
a lower trough indented in said upper trough; and
said lower trough being generally narrower than said upper trough;

said upper surface overhanging a portion of each of said two grooves; and each of said twenty-three webs initiating at a furthest inward extent of said annular protrusion of said retaining means.

16. A wheel assembly for being mounted on a trolley, said wheel assembly comprising:

a housing comprising a first shell and a second shell, said first shell and said second shell being connected to one another to form said housing;

said first shell and said second shell being injection molded;

at least one of:
means for interlocking said first shell and said second shell together; and
means for friction-locking said first shell and said second shell toegher;
to connect said first shell and said second shell to form said housing;

a wheel being mounted for rotational movement of at least partly within said housing;

said wheel comprising a central hub being disposed across said housing;

bearing means for guiding the rotational movement of said wheel;

means for retaining said bearings towards said hub;

means for reinforcing said bearing means;

said bearing means comprising a plurality of bearings;

each of said first shell and said second shell comprising at least one of an injection-molded plastic material and an injection-molded light alloy material;

each of said first shell and said second shell having an interior surface facing towards said wheel;

said reinforcing means being disposed on at least one of said first shell and said second shell; and said reinforcing means comprising a plurality of spoke-like webs extending away from said retaining means along the interior surface of said at least one of said first shell and said second shell.

17. The wheel assembly according to claim 16, further comprising:

each of said first shell and second shell defining at least one wall portion;

said at least one wall portion of each of said first shell and said second shell having varying thicknesses;

said retaining means comprising at annular protrusion protruding from the interior surface of said at least one of said first shell sand said second shell towards said wheel;

said bearings being supported between said retaining means and said hub;

each of said first shell and said second shell having an interfacing surface;

the interfacing surface of said first shell being mutually interfaced with the interfacing surface of said second shell;

means for centering said first shell and said second shell with respect to one another such that the interfacing surface of said first shell is mutually interfaced with the interfacing surface of said second shell;

said centering means comprising:

at least one centering protrusion disposed on at least one of said first shell and said second shell; and at least one centering groove disposed in the other of said at least one of said first shell and said second shell;

said at least one centering protrusion extending into said at least one centering groove to center said first shell and said second shell with respect to one another;

a central vertical axis defining a first half and a second half of each of said first shell and said second shell, the first half of said first shell being engaged with the second half of said second shell and the second half of said first shell being engaged with the first half of said second shell;

each of the first half of said first shell and the first half of said second shell having at least one said centering protrusion;

each of the second half of said first shell and the second half of said second shell having at least one said centering groove to enable the engagement of said first half of said first shell with said second half of said second shell and said second half of said first shell with said first half of said second shell;

said interlocking means comprising snap lug means;

said snap lug means comprising:
  at least one snap lug extending from at least one of said first shell and said second shell;
  at least one lug opening being disposed in the other of
said at least one of said first shell and said second shell;

each said at least one snap lug being secured in a corresponding one of said at least one lug opening to provide an interlocking connection between said first shell and said second shell;

said friction-locking means comprising at least one of:
  a) at least one sleeve hole disposed through said first shell and said second shell;
    at least one sleeve, each said at least one sleeve being disposed through a corresponding one of said at least one sleeve hole; and
    each said at least one sleeve being firmly engaged with its corresponding one of said at least one sleeve hole to provide a friction-locking connection between said first shell and said second shell; and
  b) said centering means, wherein said said centering means is configured to provide a friction-locking connection between said first shell and said second shell; said wheel assembly having a plurality of external sides; at least one groove for accommodating at least one of:
    at least one sliding block; and
    at least one nut;

said at least one groove being disposed in at least one of said external sides;

a toothed ring for providing torque support for a geared motor;

a breaking area disposed on at least one of said first shell and said second shell, said breaking area for being penetrated to create a hole to accommodate a drive shaft;

said wheel comprising at least one of a plastic material and a light alloy material;

said hub comprising an internal toothing to accommodate a toothed drive shaft;

at least one of said external sides of said wheel assembly comprising holes for mounting said wheel assembly on a trolley;

one of said external sides being an upper surface of said wheel assembly;

said at least one groove being disposed in said upper surface;

said at least one groove being two grooves;

said upper surface having a recess indented therein;

said recess being generally shallow;

said upper surface having two raised portions, each of said two raised portions flanking said recess such that said recess is disposed between said two raised portions;

each of said two grooves being disposed in one of said raised portions;

said at least one sleeve hole being four sleeve holes;

an upper two of said sleeve holes being disposed towards said upper surface of said wheel assembly;

said wheel assembly having a lower area opposite said upper surface;

a lower two of said sleeve holes being disposed towards said lower area of said wheel assembly;

a peripheral web connecting said upper two sleeve holes;

said peripheral web being an arc generally parallel to said retaining means;

some of said webs terminating at said peripheral web;

said peripheral web intersecting said upper surface generally at a tangent;

said first shell and said second shell having an identical injection-molded construction;

said at least one sleeve being four sleeves;

each of said at least one snap lug comprising a head portion and web portion;

said head portion being disposed in one of said at least one lug opening;

each of said at least one snap lug being disposed in the vicinity of one of said sleeve holes;

each said lug opening intersecting said one of said sleeve holes generally perpendicularly;

at least one of said sleeve holes comprising a recess to accommodate said lug web, such that said lug web is flush with said one of said sleeve holes to create a substantially even cylindrical passage;

slotted lug means for accommodating at least one nut;

said at least one nut being disposed adjacent one of said holes;

said two upper sleeve holes having a slightly larger diameter than said two lower sleeve holes;

each of said sleeves having a generally cylindrical shape;

each of said sleeves having an axial groove running therethrough to break said generally cylindrical shape;

each of said grooves generally having a cross-sectional shape of two semicircles joined by two parallel lines;

each said lug opening for receiving a tool therethrough to release each said snap lug;

clamp means disposed about said toothed ring;

said clamp means comprising a ring clamp;

said hub having a generally cylindrical shape;

said wheel having a rim;

said rim having a groove portion and side flange portions defining a generally U-shaped cross section;

said wheel having a plurality of spokes;

snap rings supporting said bearings;

one of said snap rings being disposed between said retaining means and said bearings;

another of said snap rings being disposed between said hub and said bearings;

said plurality of webs being twenty-three webs;

said twenty-three webs being disposed at substantially regular angular intervals about said retaining means;

nine of said twenty-three webs intersecting said peripheral web portion;

two vertical web portions, each of said two vertical web portions being disposed between one of said two upper sleeve holes and one of said two lower sleeve holes;

three of said webs intersecting one of said two vertical web portions;

another three of said webs intersecting another of said two vertical web portions;

each of said two grooves comprising:
an upper trough indented in said upper surface;
a lower trough indented in said upper trough; and
said lower trough being generally narrower than said upper trough;

said upper surface overhanging a portion of each of said two grooves; and each of said twenty-three webs initiating at a furthest inward extent of said annular protrusion of said retaining means.

* * * * *

UNITED STATES PATENT AND TRADEMARK OFFICE
CERTIFICATE OF CORRECTION

PATENT NO. : 5,209,167
DATED : May 11, 1993
INVENTOR(S) : Klaus DONNER, Eberhard BECKER and Roland STAGGL It is certified that error appears in the above-indentified patent and that said Letters Patent is hereby corrected as shown below:

On the title page, item [75], after 'Donner,', delete "Dohlenweg" and insert --Hagen 5--.

On the title page, item [75], after 'Becker,', delete "Westerwaldweg" and insert --Hagen 1--.

On the title page, item [75], after 'Staggl,', delete "Brunnenweg" and insert --Wetter--.

In column 3, line 64, after 'axis' insert --corresponding to an axial direction of the wheel 1, as in Figure--.

In column 7, line 54, before 'plastic' insert --characterized by the fact that the injection molded part is--.

In column 7, line 57, after the first occurrence of 'is' insert --light--.

In column 9, lines 29-30, Claim 1, delete "means for friction-locking said first shell and said shell together; and".

In column 9, line 40, Claim 1, after 'first', delete "wheel" and insert --shell--.

In column 10, line 61, Claim 12, after 'sleeve', delete "have" and insert --hole--.

UNITED STATES PATENT AND TRADEMARK OFFICE
CERTIFICATE OF CORRECTION

PATENT NO. : 5,209,167

DATED : May 11, 1993

INVENTOR(S) : Klaus DONNER, Eberhard BECKER and Roland STAGGL

Page 2 of 3

It is certified that error appears in the above-indentified patent and that said Letters Patent is hereby corrected as shown below:

In column 13, line 15, Claim 14, after the first occurrence of 'shell', delete "sand" and insert --and--.

In column 13, line 22, Claim 14, after 'of', delete "is a" and insert --said--.

In column 13, line 66, Claim 15, after 'least', delete "on" and insert --one--.

In column 15, line 16, Claim 15, after 'one' insert --lug--.

In column 16, line 1, Claim 15, after 'comprising:' insert the following new paragraph: --an upper trough indented in said upper surface;--.

In column 16, line 21, Claim 16, after 'shell', delete "toegher;" and insert --together;--.

In column 18, line 37, Claim 17, after 'and' insert --a--.

In column 13, line 15, Claim 14, after the first occurrence of 'shell', delete "sand" and insert --and--.

In column 13, line 22, Claim 14, after 'of', delete "is a" and insert --said--.

In column 13, line 66, Claim 15, after 'least', delete "on" and insert --one--.

UNITED STATES PATENT AND TRADEMARK OFFICE
CERTIFICATE OF CORRECTION

PATENT NO. : 5,209,167
DATED : May 11, 1993
INVENTOR(S) : Klaus DONNER, Eberhard BECKER and Roland STAGGL It is certified that error appears in the above-indentified patent and that said Letters Patent is hereby corrected as shown below:

In column 15, line 16, Claim 15, after 'one' insert --lug--.

In column 16, line 1, Claim 15, after 'comprising:' insert the following new paragraph: --an upper trough indented in said upper surface;--.

In column 16, line 21, Claim 16, after 'shell', delete "toegher;" and insert --together;--.

In column 18, line 37, Claim 17, after 'and' insert --a--.

Signed and Sealed this

Twenty-sixth Day of November 1996

Attest:

BRUCE LEHMAN

*Attesting Officer*      *Commissioner of Patents and Trademarks*